United States Patent [19]

Reiher

[11] Patent Number: 5,993,492
[45] Date of Patent: Nov. 30, 1999

[54] MIXTURE OF FIBER-REACTIVE AZO DYES, PROCESS FOR PREPARING THEM AND THEIR USE

[75] Inventor: Uwe Reiher, Hofheim, Germany

[73] Assignee: DyStar Textilfarben GmbH & Co. Duetschland KG, Germany

[21] Appl. No.: 09/191,667

[22] Filed: Nov. 13, 1998

[30] Foreign Application Priority Data

Mar. 6, 1998 [DE] Germany .......................... 198 09 671

[51] Int. Cl.⁶ ............................ D06P 1/382; D06P 1/384; D06P 3/66
[52] U.S. Cl. ............................ 8/549; 8/641; 8/918; 8/683
[58] Field of Search ................................ 8/641, 543–549, 8/918, 683

[56] References Cited

U.S. PATENT DOCUMENTS

| | | | |
|---|---|---|---|
| 5,298,607 | 3/1994 | Seiler | 534/638 |
| 5,308,362 | 5/1994 | Kayane et al. | |

FOREIGN PATENT DOCUMENTS

| | | |
|---|---|---|
| 0021105 | 1/1981 | European Pat. Off. . |
| 3102287 | 9/1982 | Germany . |

*Primary Examiner*—Margaret Einsmann
*Attorney, Agent, or Firm*—Connolly & Hutz

[57] ABSTRACT

A dye mixture comprising at least two dyes of the formula (1)

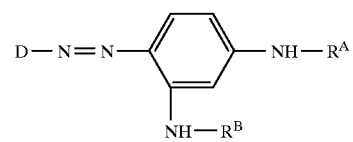

(1)

in which:

D is phenyl or naphthyl which is substituted by 1, 2 or 3, sulfo groups $R^A$ is aminocarbonyl of the formula —CO—NH$_2$ or is a group of the formula (2)

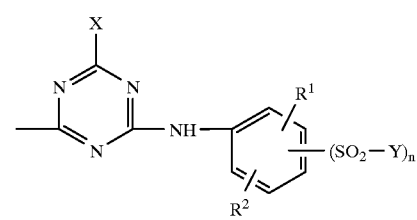

(2)

in which
X is fluoro or hydroxyl,
$R^1$ is hydrogen, methyl, ethyl, methoxy or chloro,
$R^2$ is hydrogen, methyl, ethyl, methoxy or ethoxy,
Y is vinyl or is ethyl substituted in β-position by a substituent which can be eliminated by the action of an alkali to form the vinyl group, or is β-hydroxyethyl, and
n is zero or 1 (and if n is zero this group is hydrogen).

18 Claims, No Drawings

MIXTURE OF FIBER-REACTIVE AZO DYES, PROCESS FOR PREPARING THEM AND THEIR USE

The invention is in the technical field of fiber-reactive dyes.

Numerous fiber-reactive dyes are known which are suitable for dyeing or printing hydroxyl- and/or carboxamido-containing fibers, especially cellulose fibers, in order to produce dyeings in a yellow shade. Among these dyes, particular industrial interest attaches to those known from DE-A 31 02 287, U.S. Pat. No. 5,298,607 and EP-A 0 021 105. However, these conventional yellow-dyeing dyes do not go far enough toward meeting the most recent requirements in respect, for example, of their use in specific dyeing techniques, the dyeability of the fibers, and the fastness properties of the resulting dyeings.

It was therefore an object of the invention to find fiber-reactive dyes whose dyeing properties, such as their buildup and their fixation yield, are improved over those of known dyes, as are their solubility in water and stability on storage and the fastness properties and reproducibility of their dyeings.

U.S. Pat. No. 5,308,362 has already described yellow-dyeing fiber-reactive dyes in the form of a mixture; which, however, do not sufficiently meet the above criteria. In particular, their fixation yield on cellulose fibers is still not very satisfactory.

The above object has now been solved with the present invention. Mixtures of fiber-reactive dyes of the type defined below have been found which largely remedy these disadvantages and whose dyeings on hydroxyl- and/or carboxamido-containing materials, such as, preferably, cellulose fiber materials, are superior to those of the known dye products in particular in terms of color fastness properties, such as light fastness and weather fastness.

The present invention therefore provides mixtures of two or more, such as three, four, five or six, dyes, which are of the formula (1)

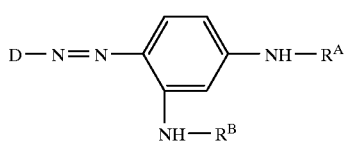

(1)

in which:

D is phenyl which is substituted by 1, 2 or 3 substituents, selected from the following group: 2 alkyl of 1 to 4 carbon atoms, such as methyl and ethyl, 2 alkoxy of 1 to 4 carbon atoms, such as methoxy and ethoxy, 2 sulfo, 1 carboxyl, 1 carbamoyl, 1 sulfamoyl, 1 bromo, 2 chloro and 1 group of the formula $-SO_2-Y^0$ in which $Y^0$ is vinyl or β-hydroxyethyl or is ethyl substituted in β-position by an alkali-eliminable substituent, such as sulfato, thiosulfato, phosphate and chloro, or is naphthyl, preferably naphth-2-yl, which is substituted by 1, 2 or 3 sulfo groups or by 1 group of the above-defined formula $-SO_2-Y^0$ or by 1 group of the above-defined formula $-SO_2-Y^0$ and 1 or 2 sulfo groups, preferably 3,6,8-trisulfonaphth-2-yl;

$R^A$ is aminocarbonyl of the formula $-CO-NH_2$ or is a group of the formula (2)

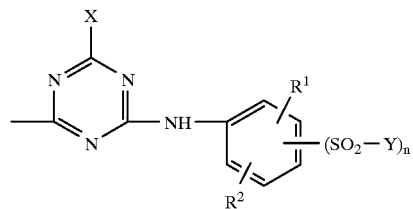

(2)

in which

X is fluoro or hydroxyl, $R^1$ is hydrogen, methyl, ethyl, methoxy or chloro, preferably hydrogen, $R^2$ is hydrogen, methyl, ethyl, methoxy or ethoxy, preferably hydrogen, Y is vinyl or is ethyl substituted in β-position by a substituent which can be eliminated by the action of an alkali to form the vinyl group, such as chloro, bromo, acetyloxy, p-tolylsulfonyloxy, thiosulfato, phosphate and especially sulfato, or is β-hydroxyethyl, and n is zero or 1 (and if n is zero this group is hydrogen);

$R^B$ is as defined for $R^A$ with the proviso that $R^A$ and $R^B$ are not simultaneously aminocarbonyl or are not simultaneously the radical of the formula (2).

In the general formulae above and below, every member of the formula can, within the scope of its definition, have different meanings in the individual dyes, or the formula members have meanings which, within the scope of their definition, are the same as or different from one another.

Mixtures of the invention comprising exclusively dyes in which n is 1 in the radical of formula (2) comprise the following dyes A and B, with or without C and/or D and with or without E and/or F, preferably the dyes A, B, C and D with or without E and/or F.

Dye A, corresponding to the formula (1) in which:

D is as defined for formula (1), $R^A$ is a radical of the formula (2) in which

X is fluoro, $R^1$ and $R^2$ are as defined for formula (2), and

Y is ethyl containing an alkali-eliminable substituent in β-position, $R^B$ is aminocarbonyl;

Dye B, corresponding to the formula (1) in which:

D is as defined for formula (1), $R^A$ is aminocarbonyl, $R^B$ is a radical of the formula (2) in which X is fluoro, $R^1$ and $R^2$ are as defined for formula (2), and Y is ethyl containing an alkali-eliminable substituent in β-position;

Dye C, corresponding to the formula (1) in which:

D is as defined for formula (1), $R^A$ is a radical of the formula (2) in which

X is fluoro, $R^1$ and $R^2$ are as defined for formula (2), and

Y is vinyl, $R^B$ is aminocarbonyl;

Dye D, corresponding to the formula (1) in which:

D is as defined for formula (1), $R^a$ is aminocarbonyl, $R^B$ is a radical of the formula (2) in which X is fluoro, $R^1$ and $R^2$ are as defined in formula (2), and
Y is vinyl;

Dye E, corresponding to the formula (1) in which:
D is as defined for formula (1),
$R^A$ is a radical of the formula (2) in which
  X is hydroxyl,
  $R^1$ and $R^2$ are as defined for formula (2), and
  Y is as defined initially for formula (1),
$R^B$ is aminocarbonyl;

Dye F, corresponding to the formula (1) in which:
D is as defined for formula (1),
$R^A$ is aminocarbonyl,
$R^B$ is a radical of the formula (2) in which
  X is hydroxyl,
  $R^1$ and $R^2$ are as defined for formula (2), and
  Y is as defined initially for formula (1).

A preferred embodiment of the invention is that in which in all dyes A to F the radical D and also, within the scope of their definition, the substituents $R^1$ and $R^2$ have the same meaning and the group —$SO_2$—Y and also $R^1$ and $R^2$ in each case occupy the same position in the benzene nucleus.

Mixtures of the invention comprising exclusively dyes in which n is zero in the radical of formula (2) comprise the following dyes S and T with or without U and/or V, preferably the dyes S, T, U and V:

Dye S, corresponding to the formula (1) in which:
D is as defined for formula (1)
$R^A$ is a radical of the formula (2) in which
  X is fluoro and
  $R^1$ and $R^2$ are as defined for formula (2),
$R^B$ is aminocarbonyl;

Dye T, corresponding to the formula (1) in which:
D is as defined for formula (1),
$R^A$ is aminocarbonyl,
$R^B$ is a radical of the formula (2) in which
  X is fluoro,
  $R^1$ and $R^2$ are as defined for formula (2);

Dye U, corresponding to the formula (1) in which:
D is as defined for formula (1),
$R^A$ is a radical of the formula (2) in which
  X is hydroxyl and
  $R^1$ and $R^2$ are as defined for formula (2),
$R^B$ is aminocarbonyl;

Dye V, corresponding to the formula (1) in which:
D is as defined for formula (1),
$R^A$ is aminocarbonyl,
$R^B$ is a radical of the formula (2) in which
  X is hydroxyl and
  $R^1$ and $R^2$ are as defined for formula (2).

A preferred embodiment of the invention is that in which in all dyes S to V is the radical D and also, within the scope of their definition, the substituents $R^1$ and $R^2$ have the same meaning and $R^1$ and $R^2$ in each case occupy the same position in the benzene nucleus.

In the overall mixture of dyes A to F the dyes A to D are present in a proportion of from 60 to 99% by weight and the dyes E and F in a proportion of from 1 to 40% by weight, the term "dye E" meaning either a single dye of the stated definition or two or more, such as two or three, dyes of the same constitution but differing in the radical Y, and, similarly, the term "dye F" meaning either a single dye of the stated definition or two or more, such as two or three, dyes of the same constitution but differing in the radical Y.

In the overall dye component of the dye mixtures of the dyes A and B and, respectively, A to F the dye B and, respectively, the dyes B and D and, respectively, B, D and F are generally present in a proportion of from 1 to 15% by weight, and in turn the proportion of the dyes C and D, in which Y is the vinylsulfonyl group, to the dyes A and B is generally in a molar ratio of from 1 to 40: from 99 to 60.

Of these dye mixtures of the invention, preference is given to mixtures of dyes A to F in each of which the radical D in formula (1) is the 3,6,8-trisulfonaphth-2-yl radical, the substituents $R^1$ and $R^2$ are both hydrogen and the group —$SO_2$—Y is attached meta or para, preferably para, to the amino group and the group Y in the dyes A and B is β-sulfatoethyl.

In the overall mixture of the dyes S to V the dyes U and V are present in a proportion of from 1 to 40% by weight. In the overall dye component of the dye mixtures of the dyes S and T and, respectively, S to V the dye T and, respectively, the dyes T and V are generally present in a proportion of from 1 to 15% by weight.

Of these dye mixtures of the invention, preference is given to mixtures of dyes S to V in each of which the radical D in formula (1) is the 3,6,8-trisulfonaphth-2-yl radical, $R^1$ is hydrogen, and $R^2$ is methyl, ethyl or methoxy.

The terms sulfo, carboxyl, thiosulfato, phosphate and sulfato cover not only the acid form but also the salt form of the respective groups. Accordingly, sulfo groups are groups conforming to the formula —$SO_3M$, thiosulfato groups are groups conforming to the formula —S—$SO_3M$, carboxyl groups are groups conforming to the formula —COOM, phosphato groups are groups conforming to the formula —$OPO_3M_2$ and sulfato groups are groups conforming to the formula —$OSO_3M$, where M is hydrogen or an alkali metal, such as sodium, potassium or lithium.

The dyes A and C and the dyes S and T can be prepared readily in analogy to the information in U.S. Pat. No. 5,298,607, it also being possible to prepare the dye C with the vinylsulfonyl group by starting from the dye A with the β-sulfatoethylsulfonyl group and subjecting it in an aqueous medium to the action of an alkali, such as sodium carbonate or sodium hydroxide, in the pH range between 8 and 9: for from about 10 to 20 minutes.

The dyes B and D and also U and V can be prepared by reacting a compound of the formula (3)

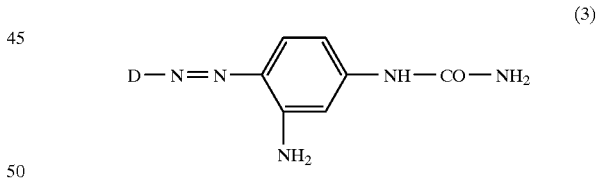

(3)

in which D is as defined above in the known procedure for reacting amino-containing compounds, with cyanuric fluoride (2,4,6-trifluoro-1,3,5-triazine) and then with a compound of the formula (4)

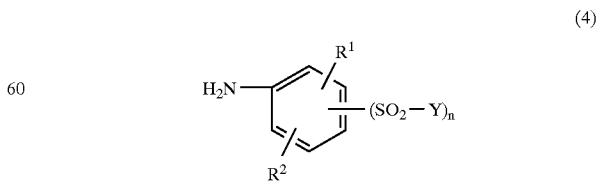

(4)

in which $R^1$, $R^2$, Y and n are as defined above, or with a compound of the formula (5)

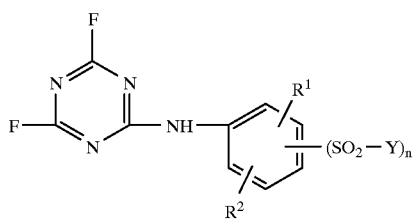

(5)

in which $R^1$, $R^2$, Y and n are as defined above.

The compounds of the formula (3) can be prepared by coupling the diazonium salt of an aromatic amino compound of the formula D—$NH_2$, where D is as defined above, to 1,3-diaminobenzene in a conventional manner and reacting the resultant monoazo compound with a cyanate, such as sodium cyanate. This procedure is described in the above-mentioned U.S. Pat. No. 5,308,362.

The dyes E and F and also the dyes U and V can be prepared, for example, from the dyes A and, respectively, B and, respectively, S and, respectively, T by subjecting the latter to the action of water in an aqueous medium at a temperature from 40 to 100° C., preferably between 60 and 80° C., and at a pH of between 1 and 4, preferably between 2 and 3, with hydrolysis reactions occurring in the case of the fluorine of the triazine and optionally in the group —$SO_2$—Y to give the β-hydroxyethylsulfonyl group.

The mixtures of the invention can be prepared in a manner familiar to the person skilled in the art: for example, by simply mixing the individual dyes, or else by synthetic means, starting from corresponding mixtures of the individual components and, within the process conditions and reaction times that are familiar to the person skilled in the art, choosing these conditions so as to give a mixing ratio which was prescribed within a more or less narrow range. This mixing ratio can be readily determined and monitored by means of HPL chromatography, so that only a few synthesis experiments are required in order to find out the detailed process conditions which will lead to a particular mixing ratio of the dye components within the mixture. In general, the procedure will be to react mixtures of azo compounds of the formulae (3) and (3a)

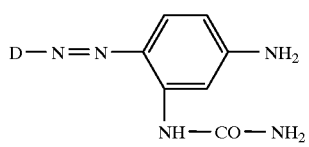

(3a)

with cyanuric fluoride and then with the amino compound of the formula (4) or with a difluorotriazine compound of the formula (5) and, if appropriate, insofar as dyes E and F and, respectively, U and V have not already been formed in the desired amount, choosing the temperature and pH range such that there is increased hydrolysis of the hydrolyzable groups.

The mixtures of the invention can be present alternatively in solid form, as powders, as granules or else as aqueous solutions. In solid form, in the manner customary for water-soluble dyes, they comprise standardizing agents, such as sodium chloride, potassium chloride or else sodium sulfate, which are in some cases already present as a result of the route by which the dyes have been synthesized. The aqueous solutions can be prepared by dissolving the mixtures in water or by dissolving the dye components in water; alternatively, they may already constitute the synthesis product obtainable following filtration, it being possible for said product itself, or following addition of a buffer, or following concentration, to be passed on directly for dyeing use. Aqueous mixtures of the invention therefore also include dyebaths and dyeing liquors which comprise the dyes A and B and, respectively, A to D, with or without E and F as well, and, respectively, the dyes S and T and with or without U and V, in accordance with the present invention. In addition to the buffer substances already mentioned, such as sodium borate, sodium acetate, disodium hydrogen phosphate, sodium dihydrogen phosphate and mixtures of these salts with or without their acids, the aqueous solutions may also include customary dyeing assistants, such as surfactants, solubility enhancers and solubilizers.

Since the dye mixtures of the invention are highly and advantageously suitable for the dyeing (including the printing) of hydroxyl- and/or carboxamido-containing material, especially fiber material, the present invention also provides for the use of the dye mixtures of the invention for dyeing hydroxyl- and/or carboxamido-containing material, especially fiber material, and a process for dyeing hydroxyl- and/or carboxamido-containing material, especially fiber material, which involves using a customary and known procedure to apply dyes in aqueous solution to the material and fixing said dyes on the material under the conditions customary for fiber-reactive dyes; for instance, using a base at room temperature or at temperatures up to 120° C.

Hydroxyl-containing materials are natural or synthetic materials containing hydroxyl groups, examples being cellulose fiber materials or regenerated products thereof and polyvinyl alcohols. Cellulose fiber materials are preferably cotton, but also other vegetable fibers, such as linen, hemp, jute and ramie fibers; regenerated cellulose fibers are, for example, staple viscose and filament viscose.

Carboxamido-containing materials are, for example, synthetic and natural polyamides, such as leather, and polyurethanes, especially in the form of fibers, examples being wool and other animal hairs, silk, nylon-6,6, nylon-6, nylon-11 and nylon-4.

The dye mixtures of the invention can be employed in customary dyeing and printing processes as described in numerous instances in the prior art for fiber-reactive dyes: for example, as per the details in published European Patent Application No. 0 694 589, pages 7 and 8. In order to ensure the levelness of the dyeing, which may be found necessary in the case of any differences in substantivity between the individual dyes of the dye mixture, it is possible to employ the customary and commercially available leveling assistants which have also been mentioned in the latter published European patent application.

The dyeings and prints obtainable with these dye mixtures possess very good fastness properties, among which it is possible in particular to highlight the light fastness, perspiration light fastness, water fastness, the various wash fastnesses, including that in the presence of peroxide, the perspiration fastness, the fastness to chlorinated bathing water, and the acid and alkali fastness properties; in addition, they possess very good fastness to rubbing and to ironing. The dye mixtures of the invention themselves possess the advantageous properties, mentioned right at the beginning, relative to prior art dye mixtures and the prior art dyeings obtainable with them.

The Examples which follow illustrate the invention. The parts and percentages are by weight unless stated otherwise. Parts by weight relate to parts by volume as the kilogram to the liter.

In the dyes described by way of formulae in the Examples, the formula member M is generally an alkali metal, such as lithium, sodium or potassium. Insofar as their synthesis is described, they are prepared from starting compounds which may be indicated in the form of their free acid but are generally employed as their alkali metal salt in the synthesis.

EXAMPLE 1

100 parts of the dye of the formula (10)

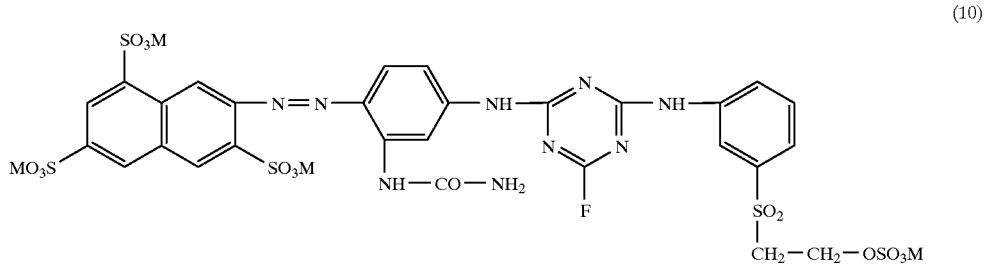

(10)

and 10 parts of a dye of the formula (11)

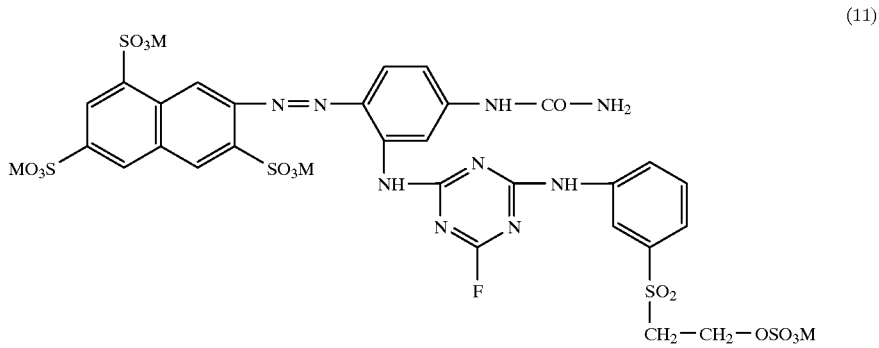

(11)

are mixed with one another. 0.3 parts of this mixture are dissolved in 200 parts of water. 10 parts of sodium sulfate and 10 parts of cotton are added. The bath is heated to 60° C., and then 4 parts of sodium carbonate are added. The dyeing procedure is carried on for one hour. The cotton is removed, washed with water, soaked and washed again with water. The result is a yellow dyeing having very good fastness properties.

EXAMPLE 2

100 parts of the dye of the formula (10) and 5 parts of the dye of the formula (11) are mixed with one another. The dyeing procedure of Example 1 is repeated using 0.1, 0.3 and, respectively, 0.6 parts of the mixture. Yellow dyeings having good fastness properties are obtained.

EXAMPLE 3

100 parts of the dye of the formula (12)

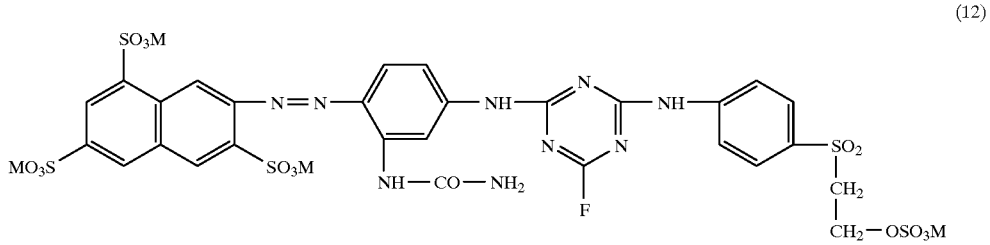

(12)

and 10 parts of the dye of the formula (13)

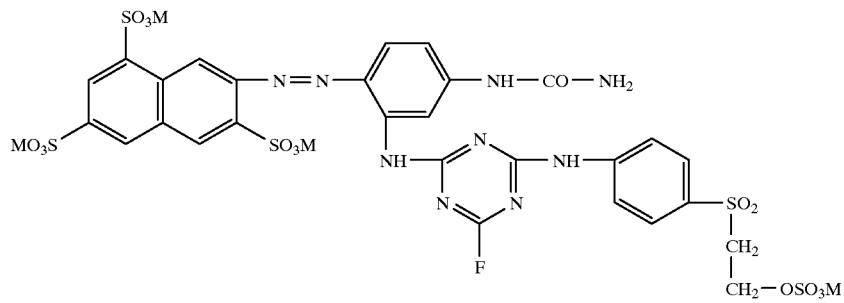

(13)

are mixed with one another. The dyeing procedure of Example 1 is repeated using 0.1, 0.3 and, respectively, 0.6 parts of the mixture. High-quality yellow dyeings having very good fastness properties are obtained.

EXAMPLE 4

0.3 parts of a mixture of 100 parts of the dye of the formula (14)

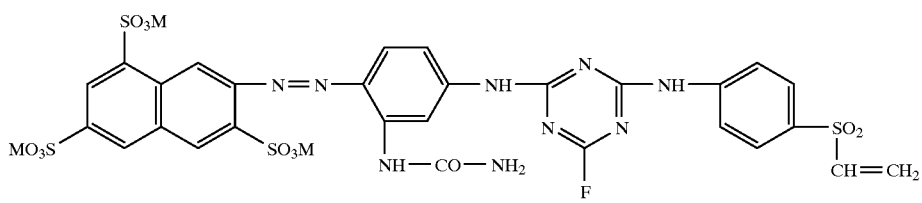

(14)

and 5 parts of the dye of the formula (15)

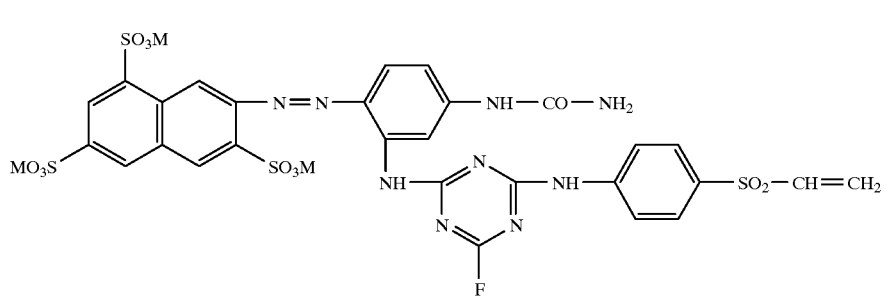

(15)

are employed in a dyeing operation as per the details of Example 1. A yellow dyeing having good fastness properties is obtained.

EXAMPLE 5

The mixtures of the invention described in Examples 1 to 4 are used to prepare color pastes having the following composition: 5 parts of the mixture of the invention, 5 parts of urea, 50 parts of 5% by weight sodium alginate base paste and 2 parts of sodium hydrogen carbonate in water, made up with water to 1000 parts.

A broad, mercerized cotton cloth is printed with the color paste, then dried, steam-treated at 100° C. for 5 minutes, washed with hot water, soaped, washed again with hot water and dried. The result is a strongly colored yellow print having outstanding fastness properties.

EXAMPLE 6

100 parts of the dye of the formula (10) and 10 parts of the dye of the formula (16) in the form of the free acid

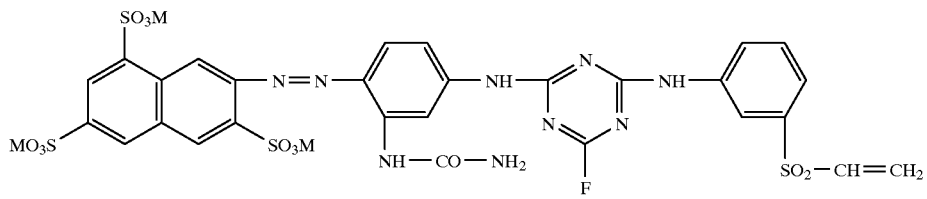

(16)

are mixed with one another.

The dyeing procedure of Example 1 is repeated using 0.1, 0.3 and, respectively, 0.6 parts of the dye composition. Yellow dyeings having outstanding fastness properties are obtained. The buildup properties of the dye composition are found to be particularly favorable. The dye of the formula (16) is prepared by treating the dye of the formula (10) in an aqueous medium at a temperature from 30 to 50° C. and at a pH of from 8 to 9.

EXAMPLE 7

100 parts of the dye of the formula (10) and 20 parts of the dye of the formula (16) are mixed with one another.

The dyeing procedure of Example 1 is repeated using 0.1, 0.3 and, respectively, 0.6 parts of the dye composition. Yellow dyeings having very good fastness properties are obtained. The buildup properties of the dyed composition are found to be particularly favorable.

EXAMPLE 8

Example 6 is repeated except that the dye of the formula (16) is used in an amount of 5 parts. The dyeing results are similar.

EXAMPLE 9

100 parts of the dye of the formula (12) and 10 parts of the dye of the formula (14) are mixed with one another. 0.1, 0.3 and, respectively 0.6 parts of the mixture are employed in the dyeing procedure of Example 1. Yellow dyeings having very good fastness properties are obtained, with a very good color buildup.

EXAMPLE 10

Example 9 is repeated except that the dye of the formula (14) is used in an amount of 20 parts. The dyeing results are similar.

EXAMPLE 11

As in Example 5, a color paste is prepared and is used to conduct a printing operation but with the modification that the mixture of the invention obtained in Example 6 is used. The result is a yellow print on cotton, having very good fastness properties; the buildup properties of the mixture are also very good.

EXAMPLE 12

100 parts of the dye of the formula (10) and 5 parts of the dye of the formula (17)

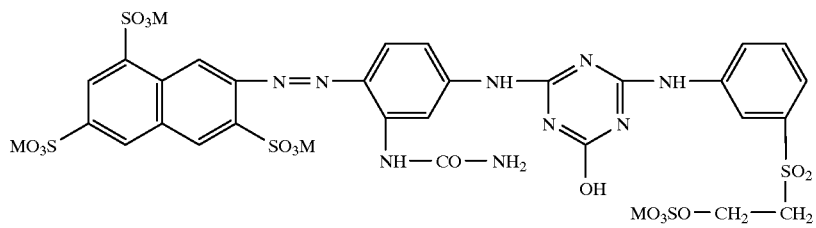

(17)

are mixed with one another.

The dyeing procedure of Example 1 is repeated using 0.6 parts of the dye composition. A yellowing dyeing having very good fastness properties is obtained.

The dye of the formula (17) is prepared by treating the dye of the formula (10) in an aqueous medium at a temperature from 60 to 80° C. and at a pH from 1 to 3.

EXAMPLE 13

Example 12 is repeated except that the dye of the formula (17) is used in an amount of 15 parts, instead of 5 parts of the dye mixture. A yellow dyeing of otherwise equally good quality is obtained.

EXAMPLE 14

100 parts of the dye of the formula (18)

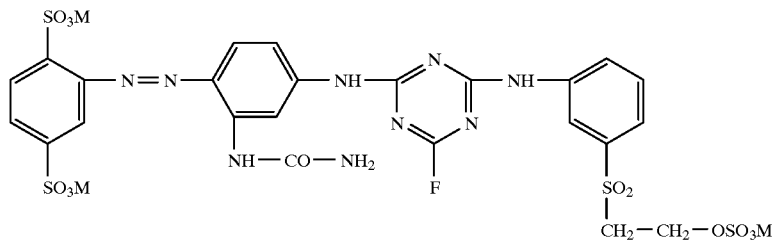
(18)

10 parts of the dye of the formula (19)

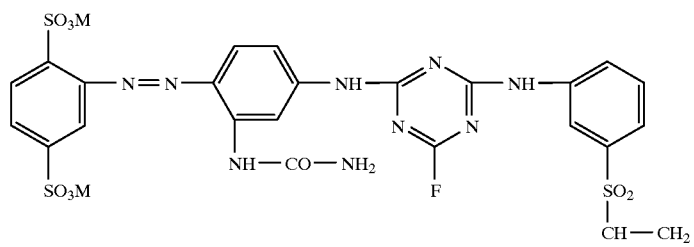
(19)

and 3 parts of the dye of the formula (20)

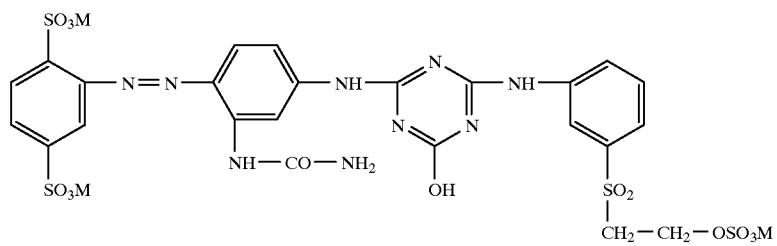
(20)

are mixed with one another. When this mixture is used to dye cotton in the manner customary for fiber-reactive dyes, strongly colored yellow dyeings having good fastness properties are obtained.

EXAMPLE 15

100 parts of the dye of the formula (12) and 5 parts of the dye of the formula (21)

are mixed with one another.

The dyeing procedure of Example 1 is repeated using 0.3 or 0.6 parts of the dye composition. Yellow dyeings having very good fastness properties are obtained.

EXAMPLE 16

100 parts of the dye of the formula (12) and 10 parts of the dye of the formula (22)

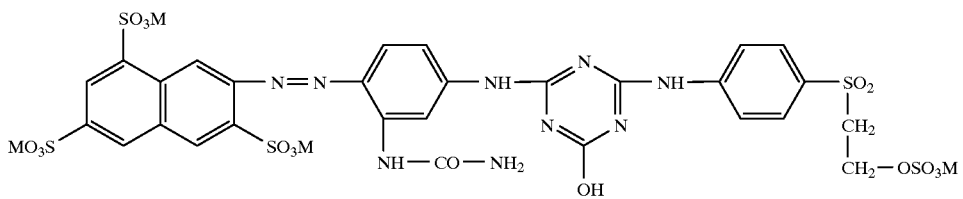
(21)

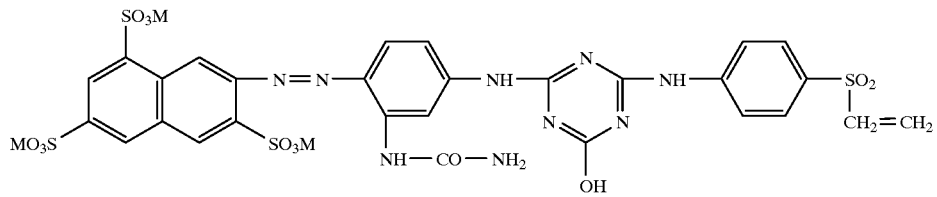

(22)

are mixed with one another.

The dyeing procedure of Example 1 is repeated using 0.3 or 0.6 parts of the dye composition. Yellow dyeings having very good fastness properties are obtained.

EXAMPLE 17

As in Example 5, a color paste is prepared and is used to print a woven cotton fabric, with the modification that the mixture of the invention described in Example 12 is used. The result is a yellow print on cotton, having very good fastness properties and a particularly favorable color buildup.

EXAMPLE 18

100 parts of the dye of the formula (10), 10 parts of the dye of the formula (16) and 5 parts of the reactive dye of the formula (17) are mixed with one another.

The dyeing procedure of Example 1 is repeated using 0.1, 0.3 and, respectively, 0.6 parts of the dye composition. Yellow dyeings having very good fastness properties are obtained. The buildup properties of the mixture of the invention are very good.

EXAMPLE 19

Example 18 is repeated except that the dyes of the formulae (16) and (17) are used in a proportion of 20 to 3 parts. The dyeing results obtained with this dye composition are similar to those of Example 18.

EXAMPLE 20

100 parts of the dye of the formula (10), 10 parts of the dye of the formula (17) and 4 parts of the dye of the formula (11) are mixed with one another. When used to dye cotton by the procedures customary for fiber-reactive dyes, the mixture of the invention gives strongly colored yellow dyeings and prints having very good fastness properties.

EXAMPLE 21

100 parts of the dye of the formula (10), 15 parts of the dye of the formula (16) and 5 parts of the dye of the formula (11) are mixed with one another. The dyeing procedure of Example 1 is repeated using 0.1, 0.3 and, respectively, 0.6 parts of the dye composition. This gives strong yellow dyeings having very good fastness properties and a very good color buildup.

EXAMPLE 22

100 parts of the dye of the formula (12), 1 part of the dye of the formula (21) and 5 parts of the dye of the formula (14) are mixed with one another. The dyeing procedure of Example 1 is repeated using 0.1, 0.3 and, respectively, 0.6 parts of the dye composition. This gives yellow dyeings having very good fastness properties and a very good color buildup.

EXAMPLE 23

100 parts of the dye of the formula (12), 15 parts of the dye of the formula (14) and 3 parts of the dye of the formula (13) are mixed with one another. When used to dye cotton by the procedures customary for fiber-reactive dyes, the mixture of the invention gives strongly colored yellow dyeings and prints having very good fastness properties.

EXAMPLE 24

100 parts of the dye of the formula (14), 5 parts of the dye of the formula (22) and 3 parts of the dye of the formula (15) are mixed with one another. When used to dye cotton by the procedures customary for fiber-reactive dyes, the mixture of the invention gives strongly colored yellow dyeings and prints having very good fastness properties.

EXAMPLE 25

To produce a dyeing on cotton, a mixture of the dyes of the formulae (10), (17), (16) and (11) in a proportion of 100:5:10:4 parts in an aqueous, alkali-containing solution is applied to the cotton material by the customary dyeing procedures for fiber-reactive dyes, and the material is then subjected to the customary fixing conditions. The dyes fixed on the substrate give a uniform, strong yellow dyeing having good fastness properties.

EXAMPLE 26

To produce a dyeing on cotton, a mixture of the dyes of the formulae (12), (21), (14) and (13) in a proportion of 100:4:15:4 parts in an aqueous, alkali-containing solution is applied to the cotton material by the customary dyeing procedures for fiber-reactive dyes, and the material is then subjected to the customary fixing conditions. The dyes fixed on the substrate give a uniform, strong yellow dyeing having good fastness properties.

EXAMPLE 27

38.3 parts of 2-aminonaphthaline-3,6,8-trisulfonic acid are diazotized in a conventional manner and the diazotization product is coupled with 15.1 parts of 3-aminophenylurea. An approximately 10% strength aqueous solution of the resulting monoazo dye is cooled to 5–10° C. and adjusted to a pH of from 6.0 to 6.5. The dye solution is then introduced into a suspension of 51.5 parts of 2,4-difluoro-6-(4'-β-sulfatoethylsulfonylphenyl)amino-1,3,5-triazine in 350 parts of water. When addition is complete the pH is adjusted to 6.0–6.5 with 15% strength sodium carbonate solution, and the reaction mixture is allowed to warm to room temperature over the course of 1 to 2 hours, after which reaction is continued until the monoazo dye can no longer be detected by chromatography. Spray-drying of the reaction solution gives a mixture of the reactive dyes of the formulae (12), (13) and (21) in a ratio of 100:9:10. Dyeings with this dye mixture possess very good fastness properties and evidence a good dye buildup.

EXAMPLE 28

If the suspension of the difluoro compound described in Example 27 has the solution of the monoazo dye added to it and is then adjusted to a pH of from 7.0 to 7.5, the result is a mixture of the dyes of the formulae (12), (13), (14) and (15) in a ratio of 100:9:12:1.0. The buildup properties of this dye mixture are found to be particularly favorable.

EXAMPLE 29

If in Example 27 the amino-azo compound formed initially is reacted with a suspension of 51.5 parts of 2,4-difluoro-6-(3'-β-sulfatoethylsulfonylphenyl)-amino-1,3,5-triazine, the result is a mixture of the dyes of the formulae (10) and (11) and of the following formula (23)

adjusted to a pH of from 7.0 to 7.5, the result is a mixture of the reactive dyes of the formulae (10), (11), (16) and (24) in a ratio of 100:9:12:1.0.

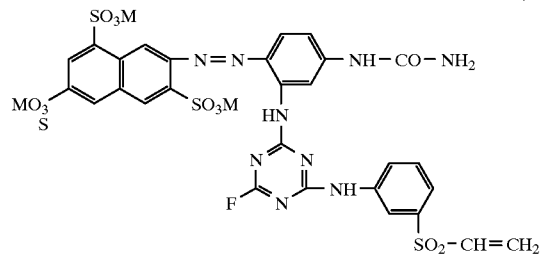

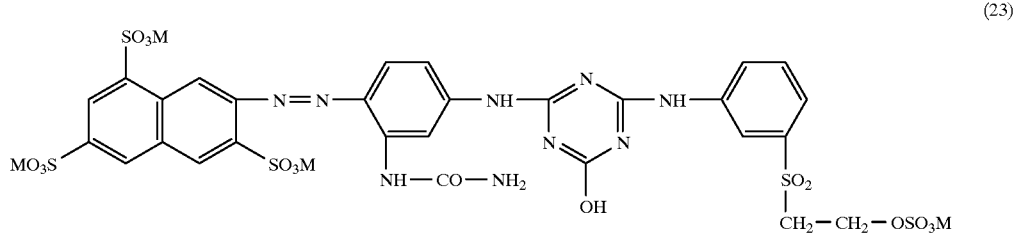

in a ratio of 100:9:10. Dyeings with this dye mixture possess outstanding fastness properties and a particularly favorable buildup.

The buildup properties of this dye mixture are found to be particularly favorable.

EXAMPLE 30

If the suspension of the difluoro compound indicated in Example 29 has the dye solution added to it and is then

EXAMPLE 31

100 parts of the dye of the formula (25)

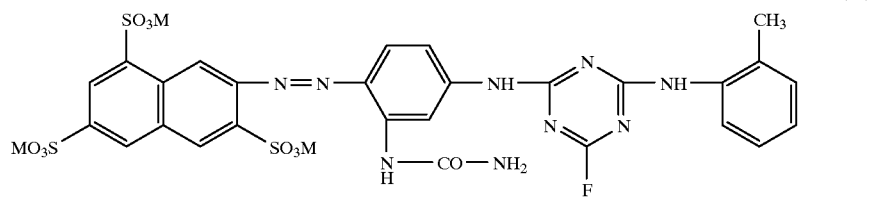

and 10 parts of a dye of the formula (26)

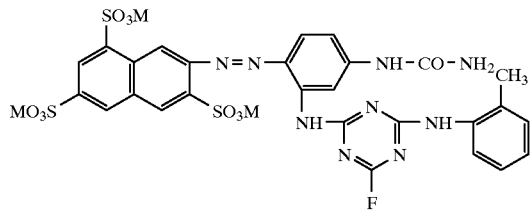

(26)

are mixed with one another. 0.3 parts of this mixture are dissolved in 200 parts of water. 10 parts of sodium sulfate and 10 parts of cotton are added. The bath is heated to 60° C., and then 4 parts of sodium carbonate are added. The dyeing operation is carried on for one hour. The cotton is removed, washed with water, soaped and washed again with water. A yellow dye having very good fastness properties is obtained.

EXAMPLE 32

100 parts of the dye of the formula (25) and 5 parts of the dye of the formula (26) are mixed with one another. The dyeing procedure of Example 1 is repeated using 0.1, 0.3 and, respectively, 0.6 parts of the mixture. Yellow dyeings having good fastness properties are obtained.

EXAMPLE 33

100 parts of the dye of the formula (25) and 5 parts of the dye of the formula (27)

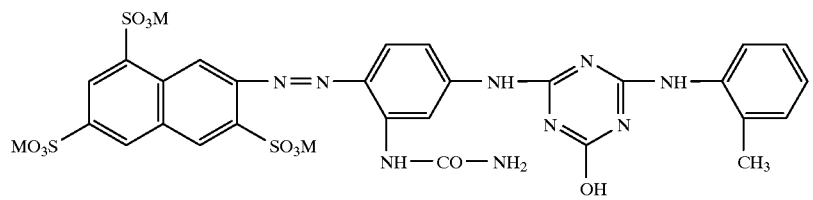

(27)

are mixed with one another.

The dyeing procedure of Example 1 is repeated using 0.6 parts of the dye composition. A yellow dyeing having very good fastness properties is obtained. The dye of the formula (27) is prepared by treating the dye of the formula (25) in an aqueous medium at a temperature from 60 to 80° C. and at a pH from 1 to 3.

EXAMPLE 34

Example 33 is repeated except that the dye of the formula (27) is used in an amount of 15 parts instead of 5 parts of the dye mixture. A yellow dyeing of otherwise equally good quality is obtained.

EXAMPLE 35

100 parts of the dye of the formula (25), 9 parts of the dye of the formula (26) and 10 parts of the dye of the formula (27) are mixed with one another. The dyeing procedure of Example 1 is repeated using 0.1, 0.3 and 0.6 parts of the mixture. Yellow dyeings having good fastness properties are obtained.

I claim:

1. A dye mixture comprising at least two dyes of the formula (1)

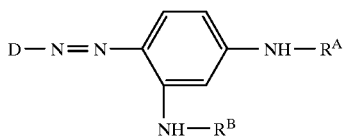

(1)

in which:
D is phenyl or naphthyl which is substituted by 1, 2 or 3 sulfo groups
$R^A$ is aminocarbonyl of the formula —CO—$NH_2$ or is a group of the formula (2)

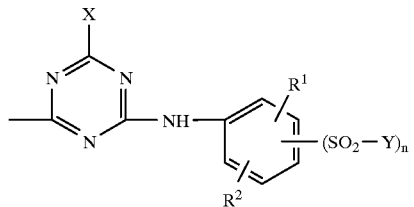

(2)

in which
X is fluoro or hydroxyl,
$R^1$ is hydrogen, methyl, ethyl, methoxy or chloro,
$R^2$ is hydrogen, methyl, ethyl, methoxy or ethoxy,
Y is vinyl or is ethyl substituted in β-position by a substituent which can be eliminated by the action of an alkali to form the vinyl group, or is β-hydroxyethyl, and
n is zero or 1 (and if n is zero this group is hydrogen);
$R^B$ is as defined for $R^A$ with the proviso that $R^A$ and $R^B$ are not simultaneously aminocarbonyl or are not simultaneously the radical of the formula (2) with the proviso that the mixture contains at least one dye in which X is fluoro.

2. A dye mixture as claimed in claim 1, comprising the following dyes A and B with or without C and/or D and with or without E and/or F:
Dye A:
D is as defined for formula (1),
$R^A$ is a radical of the formula (2) in which X is fluoro, $R^1$ and $R^2$ are as defined for formula (2), and Y is ethyl containing an alkali-eliminable substituent in β-position,
$R^B$ is aminocarbonyl;

Dye B:
  D is as defined for formula (1),
  $R^A$ is aminocarbonyl,
  $R^B$ is a radical of the formula (2) in which X is fluoro, $R^1$ and $R^2$ are as defined for formula (2), and Y is ethyl containing an alkali-eliminable substituent in β-position;

Dye C:
  D is as defined for formula (1),
  $R^A$ is a radical of the formula (2) in which X is fluoro, $R^1$ and $R^2$ are as defined for formula (2), and Y is vinyl,
  $R^B$ is aminocarbonyl;

Dye D:
  D is as defined for formula (1),
  $R^A$ is aminocarbonyl,
  $R^B$ is a radical of the formula (2) in which X is fluoro, $R^1$ and $R^2$ are as defined in formula (2), and Y is vinyl;

Dye E:
  D is as defined for formula (1),
  $R^A$ is a radical of the formula (2) in which X is hydroxyl, $R^1$ and $R^2$ are as defined for formula (2), and Y is as defined initially for formula (1),
  $R^B$ is aminocarbonyl;

Dye F:
  D is as defined for formula (1),
  $R^A$ is aminocarbonyl,
  $R^B$ is a radical of the formula (2) in which X is hydroxyl, $R^1$ and $R^2$ are as defined for formula (2), and Y is as defined initially for formula (1).

3. A dye mixture as claimed in claim 2, wherein in all dyes A to F the radical D and also the substituents $R^1$ and $R^2$ each have the same meaning and the group —$SO_2$—Y and also $R^1$ and $R^2$ in each case occupy the same position in the benzene nucleus.

4. A dye mixture as claimed in claim 1, where n is zero comprising the following dyes S and T with or without U and/or V:

Dye S:
  D is as defined for formula (1)
  $R^A$ is a radical of the formula (2) in which X is fluoro and $R^1$ and $R^2$ are as defined for formula (2),
  $R^B$ is aminocarbonyl;

Dye T:
  D is as defined for formula (1),
  $R^A$ is aminocarbonyl,
  $R^B$ is a radical of the formula (2) in which X is fluoro and $R^1$ and $R^2$ are as defined for formula (2);

Dye U:
  D is as defined for formula (1),
  $R^A$ is a radical of the formula (2) in which X is hydroxyl and $R^1$ and $R^2$ are as defined for formula (2),
  $R^B$ is aminocarbonyl;

Dye V:
  D is as defined for formula (1),
  $R^A$ is aminocarbonyl,
  $R^B$ is a radical of the formula (2) in which X is hydroxyl and $R^1$ and $R^2$ are as defined for formula (2).

5. A dye mixture as claimed in claim 4, wherein in all dyes S to V the radical D and also the substituents $R^1$ and $R^2$ each have the same meaning and $R^1$ and $R^2$ in each case occupy the same position in the benzene nucleus.

6. A dye mixture as claimed in claim 2, wherein in the overall mixture of the dyes A to F the dyes A to D are present in a proportion of from 60 to 99% by weight and the dyes E and F in a proportion of from 1 to 40% by weight.

7. A dye mixture as claimed in claim 2, wherein in the overall mixture of the dyes A to F the dye B and, respectively, the dyes B and D and, respectively, B, D and E are present in a proportion of from 1 to 15% by weight.

8. A dye mixture as claimed in claim 2, wherein the proportion of the dyes C and D to the dyes A and B is in a molar ratio of from 1 to 40: from 99 to 60.

9. A dye mixture as claimed in at least one of claim 2, wherein D is 3,6,8-trisulfonaphth-2-yl.

10. A dye mixture as claimed in claim 2, wherein $R^1$ and $R^2$ are both hydrogen.

11. A dye mixture as claimed in claim 4, wherein in the overall mixture of the dyes S to V the dyes S and T are present in a proportion of from 60 to 99% by weight and the dyes U and V in a proportion of from 1 to 40% by weight.

12. A dye mixture as claimed in claim 4, wherein in the overall mixture of the dyes S to V the dye T and, respectively, the dyes T and V are present in a proportion of from 1 to 15% by weight.

13. A dye mixture as claimed in claim 4, wherein D is 3,6,8-trisulfonaphth-2-yl.

14. A dye mixture as claimed in claim 4, wherein $R^1$ is hydrogen and $R^2$ is methyl, ethyl or methoxy.

15. A process for dyeing hydroxyl— and/or carboxamido-containing material, which involves applying dyes to the material and fixing them on the material by means of heat or an alkali or both, wherein the dyes employed comprise a dye mixture of claim 1.

16. A dye mixture as claimed in claim 3, wherein, in the overall mixture of the Dyes A to F, the Dyes A to D are present in a proportion of from 60 to 99% by weight and the Dyes E and F in a proportion of from 1 to 40% by weight.

17. A dye mixture as claimed in claim 4, wherein, in the overall mixture of the Dyes S to V, the Dye T and, respectively the Dyes T and V are present in a proportion from 1 to 15% by weight.

18. The process as claimed in claim 15, wherein the material is a fiber material.

* * * * *